United States Patent [19]

Pribnow et al.

[11] Patent Number: 5,390,300
[45] Date of Patent: Feb. 14, 1995

[54] REAL TIME I/O OPERATION IN A VECTOR PROCESSING COMPUTER SYSTEM BY RUNNING DESIGNATED PROCESSORS IN PRIVILEGED MODE AND BYPASS THE OPERATING SYSTEM

[75] Inventors: Richard D. Pribnow, Chippewa Falls; Galen Flunker, Menomenie; George W. Leedom, Jim Falls; Alan J. Schiffleger, Chippewa Falls, all of Wis.

[73] Assignee: Cray Research, Inc., Eagan, Minn.

[21] Appl. No.: 200,921

[22] Filed: Feb. 22, 1994

Related U.S. Application Data

[63] Continuation of Ser. No. 677,647, Mar. 28, 1991, abandoned.

[51] Int. Cl.$^6$ ............................ G06F 9/46; G06F 9/00
[52] U.S. Cl. .................................. 395/275; 395/650;
364/DIG. 1; 364/230; 364/230.3; 364/230.5;
364/242.4
[58] Field of Search ............... 395/200, 275, 375, 650,
395/700

[56] References Cited

U.S. PATENT DOCUMENTS

| | | | |
|---|---|---|---|
| 3,508,206 | 4/1970 | Norberg | 395/200 |
| 4,418,382 | 11/1983 | Larson | 395/200 |
| 4,493,030 | 1/1985 | Barratt et al. | 395/200 |
| 4,901,230 | 2/1990 | Chen et al. | 395/325 |
| 4,937,777 | 6/1990 | Flood et al. | 395/325 |
| 5,067,071 | 11/1991 | Schanin et al. | 395/275 |

FOREIGN PATENT DOCUMENTS 0049158 4/1982 European Pat. Off. .
2099619 12/1982 United Kingdom .

OTHER PUBLICATIONS

Kenneth Short, "Microprocessors and Programmed Logic", 1981, pp. 319, 250, 258–259, 265–267, 294.
Compar 88, British Computer Society, 1988, pp. 94–103; R. Manner et al.: "The Hidelberg Polyp Multiprocessor Project" see pp. 95–96.

Primary Examiner—Thomas C. Lee
Assistant Examiner—D. Dinh
Attorney, Agent, or Firm—Schwegman, Lundberg & Woessner

[57] ABSTRACT

The present invention provides a vector processing computer system adapted for real-time I/O. The present invention combines a rotating priority interrupt scheme, dedicated real-time interrupt lines for each processor, and access to privileged communication/control modes of operation for processors operating in real-time to create a flexible hardware design adaptable for use in many different real-time applications.

12 Claims, 7 Drawing Sheets

FIG. 3

REAL TIME I/O OPERATION IN A VECTOR PROCESSING COMPUTER SYSTEM BY RUNNING DESIGNATED PROCESSORS IN PRIVILEGED MODE AND BYPASS THE OPERATING SYSTEM

This is a continuation of application Ser. No. 07/677,647, filed Mar. 28, 1991, now abandoned.

FIELD OF THE INVENTION

The present invention relates to parallel vector computer systems and in particular the present invention describes a method and apparatus for performing real-time I/O operations in a vector multiprocessing computer system.

BACKGROUND OF THE INVENTION

Many computer applications arise which require a computer to respond to external events and to perform computations and control functions within specified, often very brief time limits. Systems of this type are referred to as response- or real-time-oriented systems. Two things must be accomplished in real-time. First, data must be transferred from the I/O subsystem to the processors in a timely fashion, and second the processors must complete their computations on that data in a timely fashion. In other words, there must be a predictable computation latency. The transfers and computations must occur in predictable time intervals in order to meet the concept of real-time operation. Depending upon the application, the time intervals involved may range from several microseconds to several seconds.

These time intervals can be termed "time slices". In a slice of time, the system will receive input data, process that data, and send any resulting data back out of the system. The time slice then, consists of an input time, a compute time, and finally an output time. To determine the minimum time slice (i.e. the fastest real-time response at which a computer system can perform), the input time, compute time and output time must be taken into account. The slowest of these dictates the minimum time slice available.

Historically, the slowest of these has been the compute time. Hence, the data is transferred into the processors while the processors are performing the previous computations, and then the data is sent out while the processors are performing the next computation such that the input, compute, and output time slices are overlapping. This process achieves data chaining. However, as systems develop more and more computational speed, the input times and output times become a limiting factor of the real-time response. Thus, any real-time system design must be cautious to ensure that the input and/or output times do not exceed the compute time.

Some applications require that an entire multiprocessing machine be dedicated real-time. One such dedicated real-time application is a jet simulator. In order for the simulator to accurately simulate the actions and responses of a real jet, the simulator's computer system must be capable of responding almost immediately to the input into the system (such input includes the pilot "steering" the simulator, operating the controls, changing "scenery", fuel status, mechanical problems, etc.). One drawback of existing real-time simulators is that the response lags behind the input so much that by the time the simulator responds, the simulated jet does not respond as a real jet would but rather feels sluggish. As a result, the simulator does not accurately reflect for the pilot the flying experience of an actual jet.

Another application of a real-time dedicated system are those applications involving a very large amount of data. Although these applications are not so concerned with an immediate response to changing input, they must make sure they can process all the data entering the system in a certain allotted time to be sure that no data is lost.

Other real-time applications do not require that an entire multiprocessing computer system be dedicated real time, but do need the system or portions thereof to be able to run real-time tasks when necessary. Thus, a system must be able to activate a certain number of its processors (this number will depend on the task to be accomplished) to real-time operation when necessary, and be able to return those processors to a normal mode of operation once the real-time job is completed.

Accordingly, it is readily seen that there is a need in the art for increasingly fast response real-time vector computer systems. There is also a need in the art for a real-time vector computer system which is easily adaptable to, and which can be used for, several different types of real-time application.

SUMMARY OF THE INVENTION

The present invention provides a multiprocessing vector computer system adapted for real-time I/O. The present invention combines a memory reference priority scheme, dedicated real-time interrupt lines for each processor, and access to privileged communication/control modes of operation for processors executing real-time jobs. The present invention is specifically designed to provide accurate and efficient real-time operation in many different real-time environments. The present invention therefore utilizes a flexible hardware design adaptable for use in many different real-time applications.

BRIEF DESCRIPTION OF THE DRAWINGS

In the drawings where like numerals refer to like elements throughout the several views:

FIG. 3 shows the exchange package used in the vector processing computing system of the present invention.

DETAILED DESCRIPTION OF THE PREFERRED EMBODIMENT

The present invention relates to a method for performing real-time I/O operations in a vector multiprocessor computing system. In particular, the present invention provides special interrupts for invoking real-time operation, a mode wherein real-time processors have access to privileged communication channels such that processors operating in real-time can bypass the operating system, and a memory reference priority scheme such that all real-time processors have the highest processor-to-memory reference priority to increase real-time processing speed and efficiency.

Figure 1:
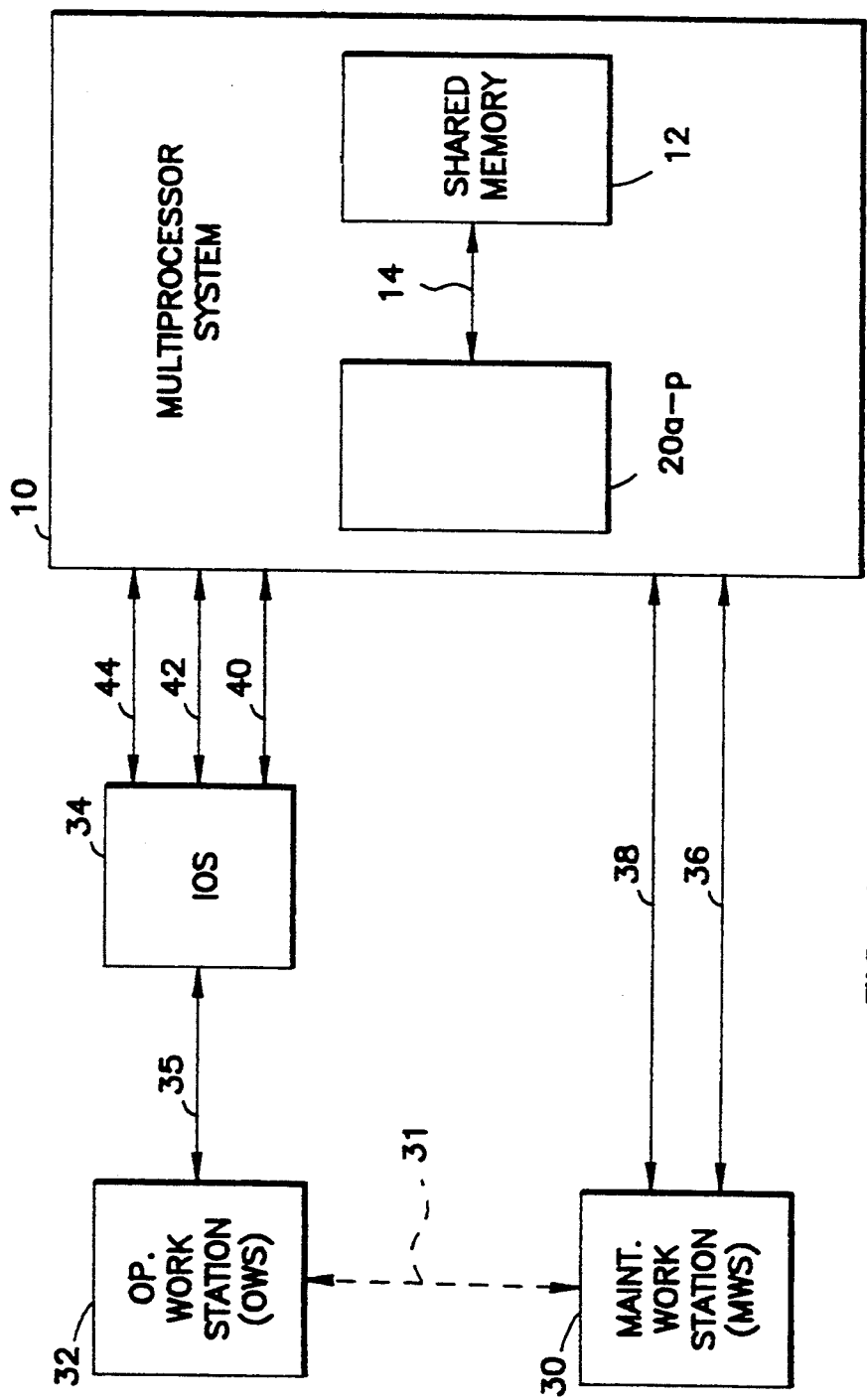
FIG. 1 is a block diagram of the multiprocessor system of the type used in the present invention connected through an input-output system (IOS) to an operator work-station (OWS) and a maintenance workstation (MWS)

FIG. 1 shows a block diagram of the multiprocessor system 10 of the present invention connected to a maintenance workstation (MWS) 30 through a maintenance channel 36. System 10 is also connected through an input/output processor (IOS) 34 to an operator's workstation (OWS) 32. A more detailed description of the design and operation of IOS 34 can be found in U.S. patent application Ser. No. 07/390,722, now U.S. Pat. No. 5,347,637, to Robert J. Halford et al. entitled MODULAR I/O SYSTEM FOR SUPERCOMPUTERS, filed Aug. 8, 1989, assigned to Cray Research, Inc., the assignee of the present invention, which is incorporated herein by reference. OWS 32 and MWS 30 communicate with each other through a dedicated, modified ethernet cable link 31.

MWS 30 and OWS 32 are comprised of small VME-based workstations with color graphic CRT, disc drives, etc. Those skilled in the art will readily appreciate that any computer system could be substituted for the VME-based work-stations described above. Generally, OWS 32 is used by system operators to run user task software on multi-processor system 10. MWS 30 is used by maintenance personnel for running diagnostics on system 10 when hardware failures occur. Essentially, OWS 32 can be thought of as the "software connection" into system 10 and MWS 30 can be thought of as the "hardware connection" into system 10.

The present invention is specifically designed for a vector multiprocessor system 10 having sixteen processors 20. It shall be understood, however, that the principles of the present invention can be applied to multiprocessor systems having a greater or lesser number of processors without departing from the scope of the present invention. It shall also be understood that the processors used need not be vector processors, but also that scalar processors could be used without departing from the scope of the present invention.

In the preferred embodiment of the present invention, the sixteen processors 20 share a common memory 12. Each processor is connected to the shared memory through a memory path 14. Memory references between processors 20 and shared memory 12 are arbitrated through use of a rotating priority scheme. A detailed description of the priority scheme used in the preferred embodiment of the present invention can be found in U.S. patent application Ser. No. 07/531,861, now U.S. Pat. No. 5,247,637 entitled METHOD AND APPARATUS FOR SHARING MEMORY IN A MULTIPROCESSOR SYSTEM, to Leedom et al., filed Jun. 1, 1990, which application is incorporated herein by reference.

Figure 2:
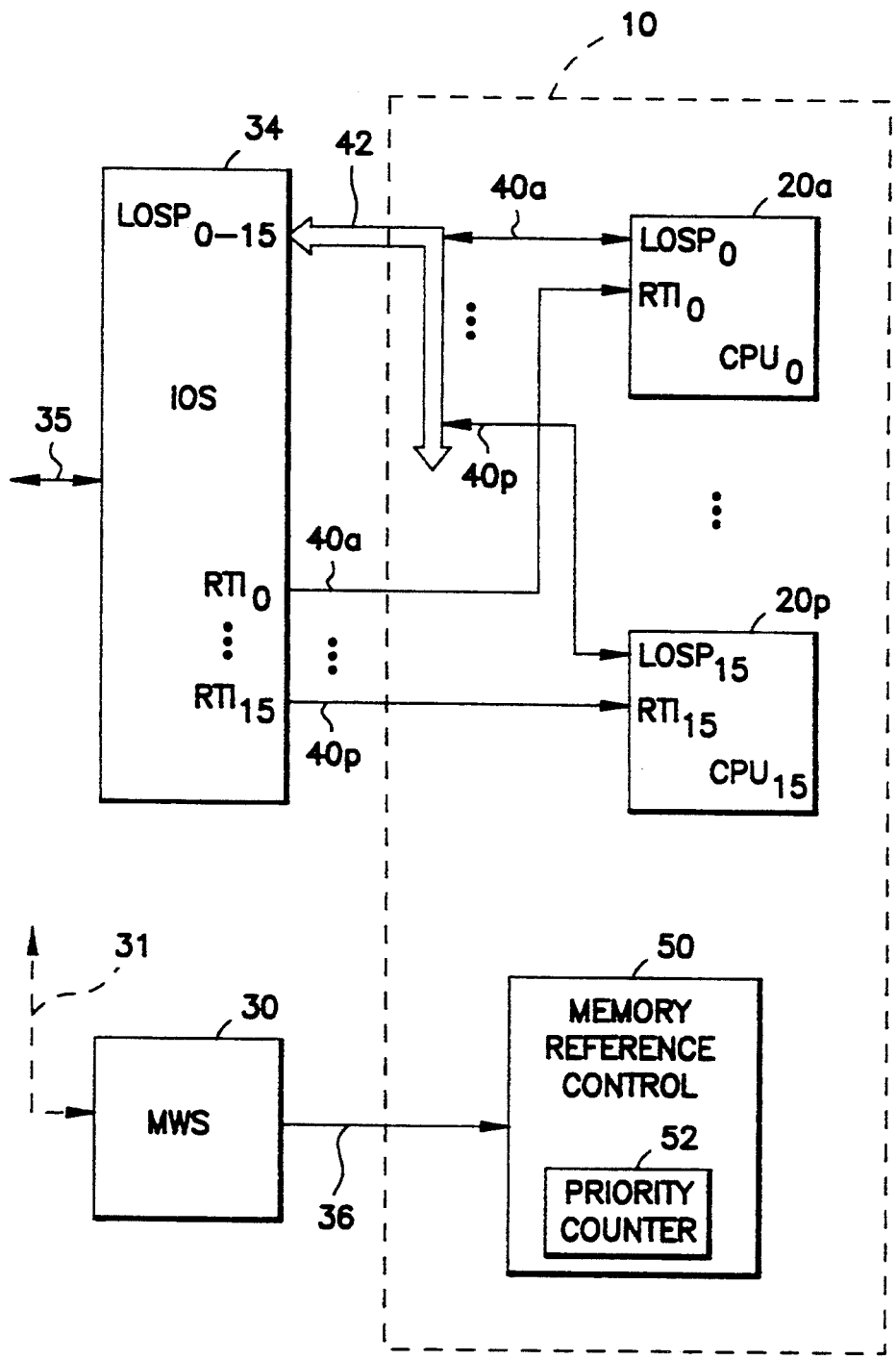
FIG. 2 is a more detailed block diagram showing the connections between the IOS and the multiprocessor system used in the present invention.

Referring now to FIG. 2, the operation of the present invention will be explained. FIG. 2 shows in more detail the specific hardware features of the preferred embodiment of the present invention. When system 10 is not dedicated real-time, the operating system or a user must be able to invoke a processor or group of processors into real-time operation when necessary. The present invention accomplishes this through the use of real-time interrupt lines 40. Each processor 20 has a dedicated real-time interrupt line 40 along which each processor 20 can be sent a real-time interrupt from IOS 34. A user can thus invoke a real-time job by entering an appropriate command into OWS 32. The operating system then decodes the instruction, determines which real-time job is to be run, and assigns a processor or group of processors (depending on the nature and size of the real-time job involved) to execute the real-time job. OWS 32 then signals IOS 34 to send a real-time interrupt signal along real-time interrupt lines 40 to a processor or group of processors 20. Upon receipt of a real-time interrupt, a processor 20 will stop and save whatever task it is currently executing and begin execution of the appropriate real-time task.

When a user enters a real-time command into OWS 32 and the operating system determines which processor or group of processors will run the particular real-time job involved, OWS 32 sends this information to MWS 30 along ethernet cable link 31. The purpose of informing MWS 30 is so that the rotating priority scheme used to arbitrate memory references between the processors 20 can be altered so as not to interfere with the real-time operations. Because the compute time must be reduced to a minimum in order to effectively meet the goal of real-time operation, those processors which are running real-time jobs (hereinafter referred to as "real-time processors") must have the highest memory reference priority. If this does not occur, other processors with less urgent memory reference needs may, due to the rotating priority scheme, have a higher memory reference priority thus forcing a real-time processor to wait. To those skilled in the art it is readily apparent that this waiting would make it impossible for a processor to effectively execute in real-time. Therefore, the present invention utilizes a scheme whereby the rotating priority scheme is not used when any processor or group of processors are running in real-time anywhere in system 10. This scheme is described below.

As described herein previously, memory references between processors 20 are arbitrated through use of a rotating priority scheme. Memory reference control 50 controls the rotating priority scheme. Memory reference control 50, in the preferred embodiment of the present invention, is implemented as part of shared memory 12. However, those skilled in the art will readily recognize that memory reference control 50 could be implemented in a different manner without departing from the scope of the present invention.

Memory reference control 50 accomplishes the rotating priority scheme through use of priority counter 52. Priority counter 52 is used to set the memory reference priority between processors 20. Priority counter 52 is four bits in length, and can have the values from 0 to 15, one for each processor 20. The value of the count contained in priority counter 52 refers to the processor having the highest memory reference priority at that time, and also determines the priority order of the remaining processors. Memory reference control 50 and priority counter 52 are more thoroughly described in U.S. patent application Ser. No. 07/531,861 entitled "Method and Apparatus for Sharing Memory in a Multiprocessor System", to Leedom et al., filed Jun. 1, 1990, now U.S. Pat. No. 5,247,637 which application is incorporated herein by reference.

MWS 30, through maintenance channel 36, has the ability to control priority counter 52 contained in memory reference control 50. When MWS 30 receives information along ethernet cable link 31 that a certain processor or group of processors are to run a real-time job, MWS 30, through maintenance channel 36, causes priority counter 52 to be set such that the real-time processors have the highest memory reference priority.

Because an essential element of meeting the goal of real-time is minimizing the input, compute, and output time slices, those skilled in the art will readily recognize and appreciate that by raising the real-time processors to the highest memory reference priority accomplishes all three of these goals. First, compute time is minimized because the real-time processors have the highest memory reference priority, and therefore will not have to wait while other processors perform memory references before having access to shared memory. Second, assuming that the same processors which are executing real-time instructions also are handling the corresponding I/O transfers, the input and output time slices are minimized because the real-time processors also have the highest I/O priority.

In one preferred embodiment of the present invention, MWS 30 simply hard stops priority counter 52 at a particular count. As a result, priority among processors 20 will not rotate at all if a real-time job is running anywhere on multiprocessor system 10. An alternate preferred embodiment of the present invention utilizes a scheme which rotates within ranges. For example, if processors 0 and 1 were running real-time jobs, those two processors would always have the two highest priority counts. Priority for processors 2 through 15 would rotate amongst the last fourteen priority counts. Those skilled in the art will readily recognize that either of these or further alternative embodiments for controlling priority during real-time operation could be used without departing from the scope of the present invention. As stated herein previously, when a processor or group of processors are performing real-time operations, not only the compute time slice but also the input and output time slices are critical. Therefore, IOS 34 must have an effective way to signal the real-time processors that input data is available. Similarly, the real-time processors must have an effective way to signal IOS 34 that output data is available. The present invention accomplishes these two goals through several different but cooperative methods.

The present invention utilizes several different methods to signal a real-time processor that input data is available. The first of these uses a "mailbox" in memory. IOS 34 sends a one word transfer into multi-processor system 10 to a specific predetermined memory location called a mailbox. Each processor in multiprocessor system 10 has its own dedicated mailbox. The transferred word contains information indicating that input data is available for that processor. To find out whether input data is available, a real-time processor simply polls the memory location once every predetermined time interval. When the mailbox contains the input ready information, the real-time processor then inputs the data.

Those skilled in the art will readily appreciate that this mailbox method of signaling a real-time processor that input data is available, is far superior and faster than a scheme wherein the IOS 34 must go through the operating system to alert the processor that input data is available. This operating system scheme would require at least a one microsecond time frame to complete. However, a real-time processor could poll memory every two hundred nanoseconds without overburdening memory in any way. Thus, it is cheaper in terms of time for the real-time processor to wait and poll on a memory location than to go through the operating system.

An alternate method of the present invention uses the real-time interrupt to signal the real-time processor that input data is available by using the interrupt to invoke the operating system. The operating system then handles the interrupt separately and signals the executing real-time job that the interrupt occurred thereby notifying the processor that input data is available. Although this method is not particularly suited for those real-time applications where time is absolutely critical, those skilled in the art will readily recognize that even though this method is slower than the previously described method due to the operating system involvement, it is still an effective way to notify the real-time processor that input data is available.

Each processor 20 must also have an efficient way of notifying IOS 34 that output data is available. The preferred embodiment of the present invention accomplishes this by allowing real-time processors access to a privileged operational mode. In the preferred embodiment of the present invention, this privileged operational mode is called "monitor mode". In general, monitor mode is used for privileged system instructions. The monitor mode instructions (channel control, set real-time clock, programmable clock interrupts, set base and limit address, exchange package set-up, etc.) perform specialized functions that are useful to the operating system. These instructions run only when a processor is operating in monitor mode. If a monitor mode instruction issues while a processor is not in monitor mode, the instruction is treated as a no-op instruction and does not execute. A further feature of monitor mode is that most interrupts can be individually turned on or off. Whether a particular interrupt is turned on or off depends upon the purpose for which the processor in question is using monitor mode. Those skilled in the art will readily recognize that most system users do not have access to these machine-dependent instructions to ensure that (1) users do not interfere with each other's or the system's data or programs, and (2) no single user monopolizes shared resources and lowers system efficiency.

Figure 3:
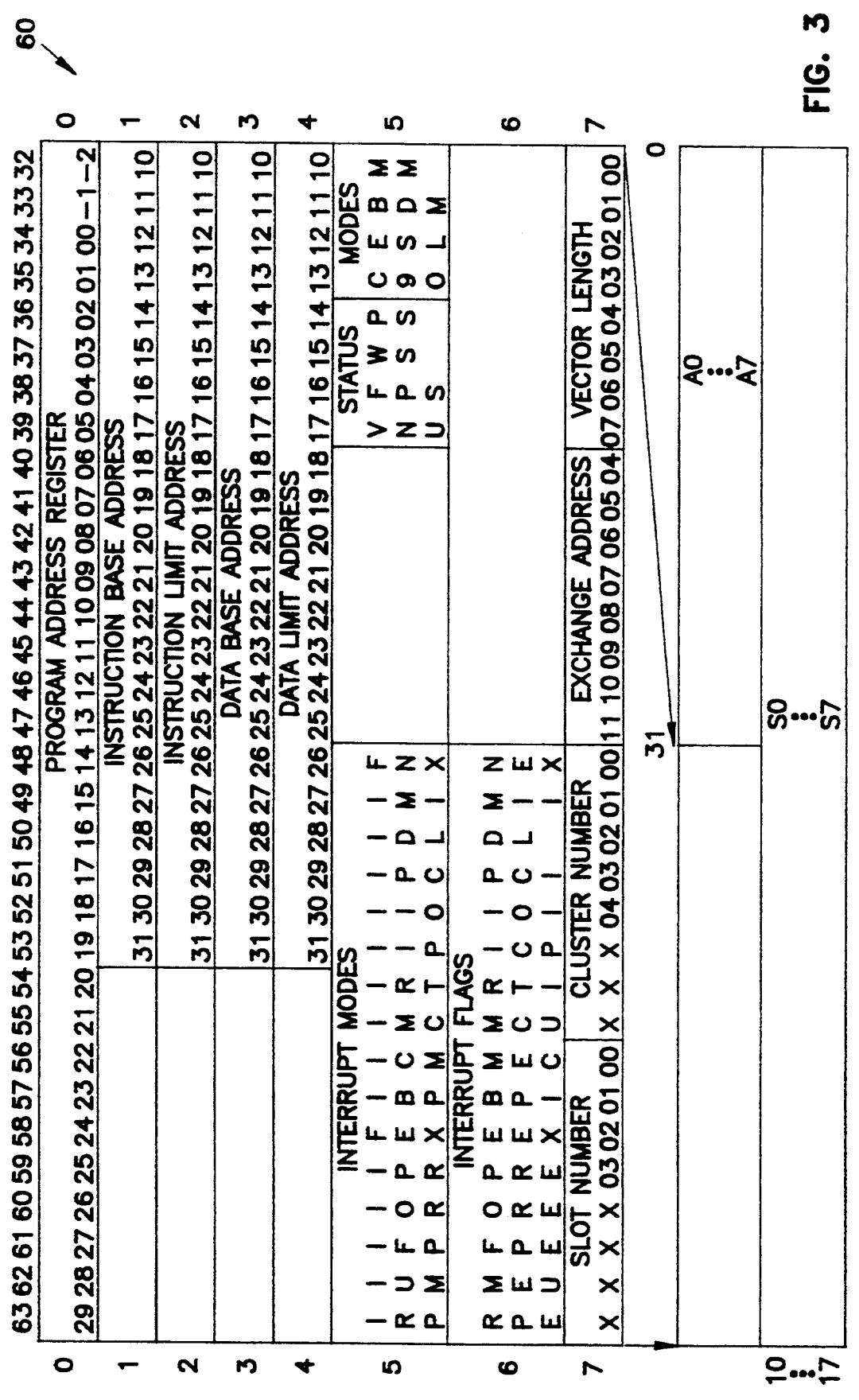

Whether a particular processor is in monitor mode is controlled by the exchange package. The exchange package 60 is shown in FIG. 3. Exchange package 60 is a 16-word block of data in memory associated with a particular computer program. Exchange package 60 contains the basic parameters necessary to provide continuity when a program stops and restarts from one section of the program to the next. The exchange package also holds the contents of the address (A) and scalar (S) registers. The address and scalar registers, along with the exchange package used in the present invention are described in more detail in U.S. patent application Ser. No. 07/618,748 filed Nov. 27, 1990, entitled "Vector Shift By 'Vo Shift Count in Vector Supercomputer Processor", now abandoned, which application is incorporated herein by reference. Table 1 describes the bit assignments for the interrupt modes, flags, status, and mode (note that "MM" in the mode field designates whether a processor is in monitor mode).

TABLE 1

| INTERRUPT MODES | |
|---|---|
| IRP | INTERRUPT ON REGISTER PARITY ERROR |
| IUM | INTERRUPT ON UNCORRECTABLE MEMORY ERROR |
| IFP | INTERRUPT ON FLOATING POINT ERROR |
| IOR | INTERRUPT ON OPERAND RANGE ERROR |

TABLE 1-continued

| | |
|---|---|
| IPR | INTERRUPT ON PROGRAM RANGER ERROR |
| FEX | ENABLE FLAG ON ERROR EXIT (DOES NOT DISABLE EXCHANGE) |
| IBP | INTERRUPT ON BREAKPOINT |
| ICM | INTERRUPT ON CORRECTABLE MEMORY ERROR |
| IMC | INTERRUPT ON MCU INTERRUPT |
| IRT | INTERRUPT ON REAL-TIME INTERRUPT |
| IIP | INTERRUPT ON INTER-PROCESSOR INTERRUPT |
| IIO | INTERRUPT ON I/O |
| IPC | INTERRUPT ON PROGRAMMABLE CLOCK |
| IDL | INTERRUPT ON DEADLOCK |
| IMI | INTERRUPT ON 001 INSTRUCTION |
| FNX | ENABLE FLAG ON NORMAL EXIT (DOES NOT DISABLE EXCHANGE) |
| INTERRUPT FLAGS | |
| RPE | REGISTER PARTY ERROR |
| MEU | MEMORY ERROR-UNCORRECTABLE |
| FPE | FLOATING POINT ERROR |
| ORE | OPERAND RANGE ERROR |
| PRE | PROGRAM RANGE ERROR |
| EEX | ERROR EXIT (000 ISSUED) |
| BPI | BREAKPOINT INTERRUPT |
| MEC | MEMORY ERROR-CORRECTABLE |
| MCU | MCU INTERRUPT |
| RTI | REAL-TIME INTERRUPT |
| ICP | INTER-PROCESSOR INTERRUPT |
| IOI | I/O INTERRUPT (IF IIO & SIE) |
| PCI | PROGRAMMABLE CLOCK INTERRUPT |
| DL | DEADLOCK (IF IDL & NOT MM) |
| MII | 001 INSTRUCTION INTERRUPT (IF IMI & NOT MM) |
| NEX | NORMAL EXIT (004 ISSUED) |

| STATUS | | MODES | |
|---|---|---|---|
| PS | PROGRAM STATUS | MM | MONITOR MODE |
| WS | WAITING ON SEMAPHORE | BDM | ENABLE BI-DIRECTIONAL MEMORY |
| FPS | VECTORS POINT STATUS | ESL | ENABLE SECOND VECTOR LOGICAL |
| VNU | VECTORS NOT USED | C90 | C90 MODE |

FIG. 4 is a simplified block diagram of a vector processor 20 of the type used in the preferred embodiment of the present invention. FIG. 5 is a more detailed block diagram of the same processor 20. Each processor 20 contains eight vector registers V0–V7. The vector registers V0–V7 each contain 128 words, each word consisting of 64 bits. For example, vector register V0 contains words $V0_0$–$V0_{127}$. The vector registers are interfaced to functional units which perform various logical and arithmetic functions on data from the vector registers. The functional units are fully segmented with latches so that operands can be sent to a functional unit on successive clock periods. Therefore, during the execution of an instruction, each part of a functional unit may be operating on a different operand. Also, each functional unit may operate independent of the other functional units so that more than one result may be obtained from the functional units for each clock period.

Figure 4A:
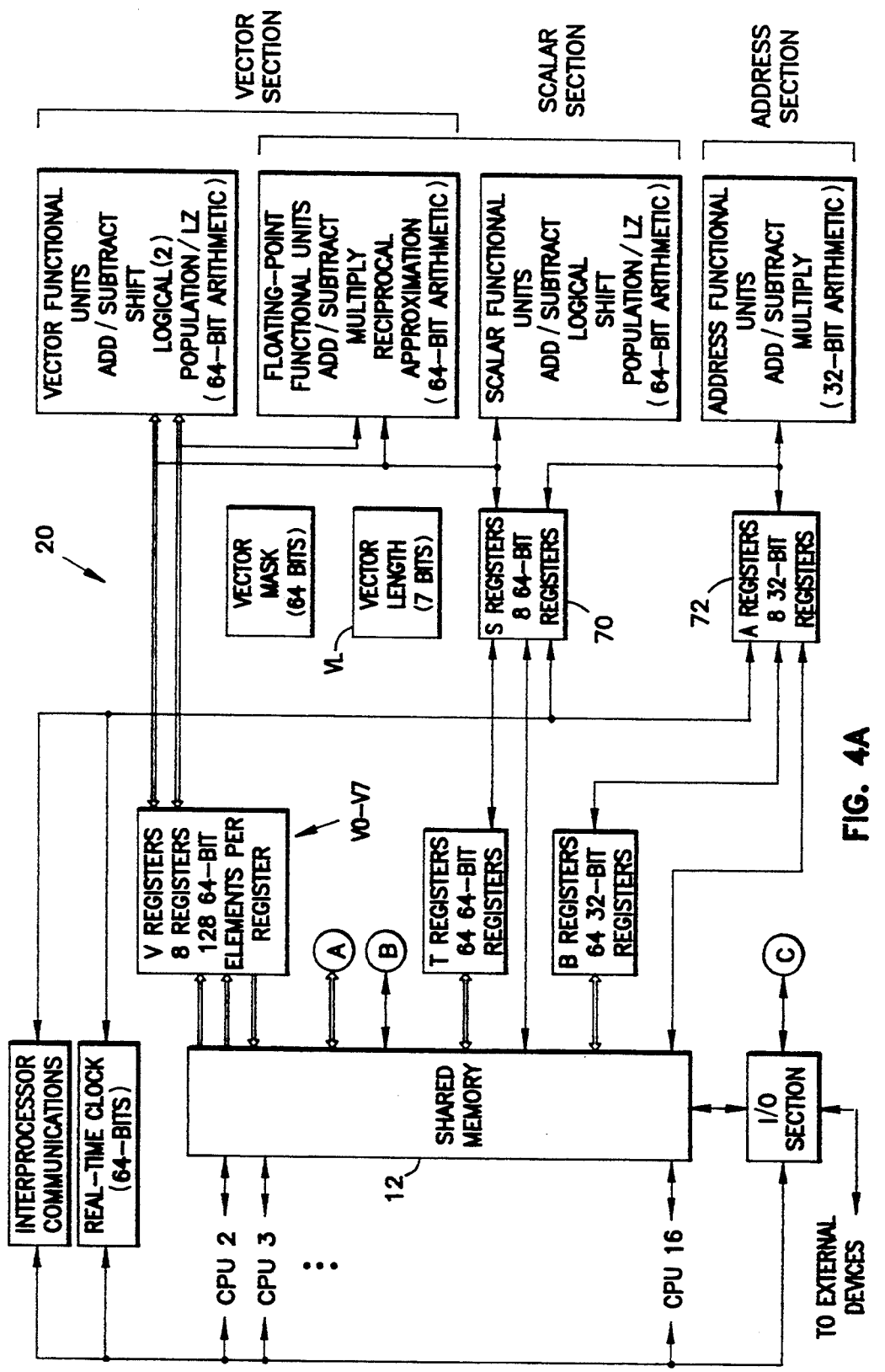
FIG. 4a,b show a simplified block diagram of a vector processor of the type used in the present invention.
Figure 4B:
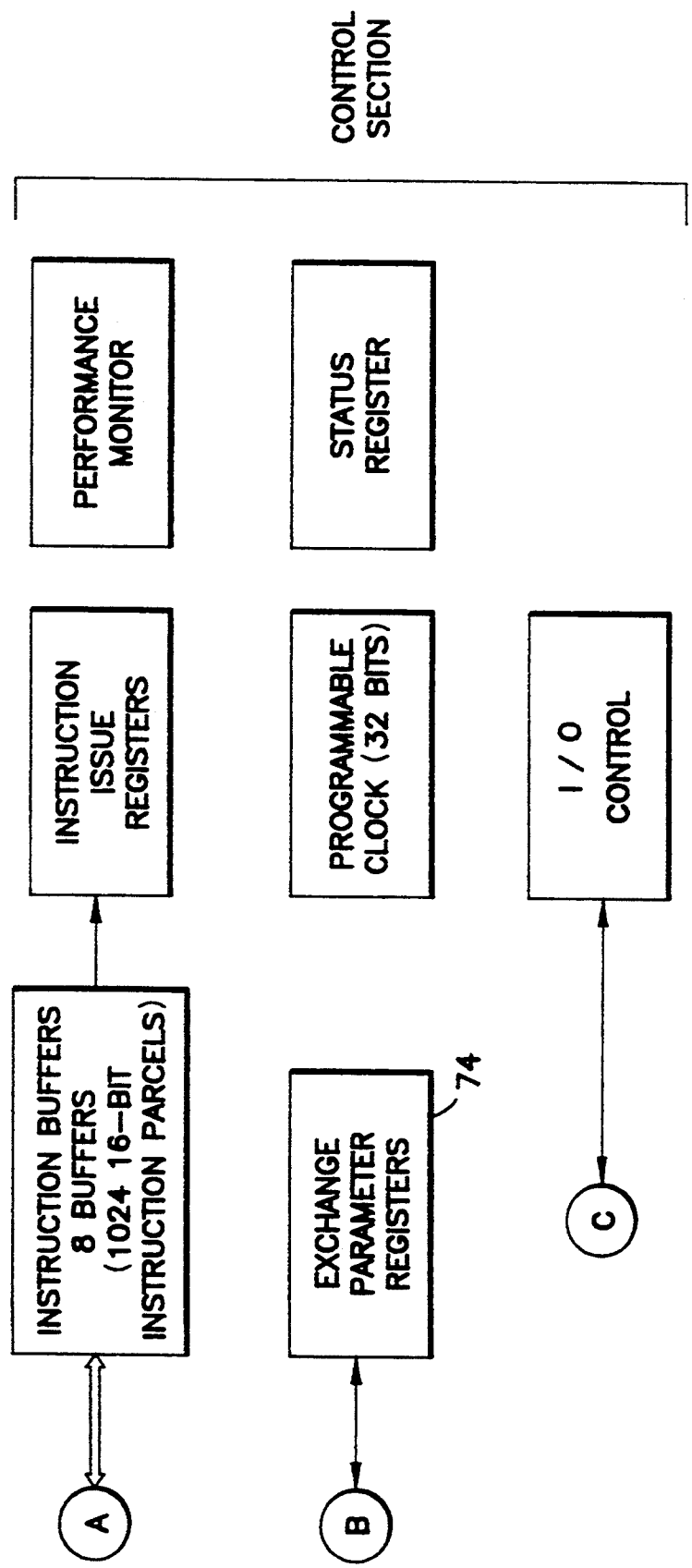
Figure 5A:
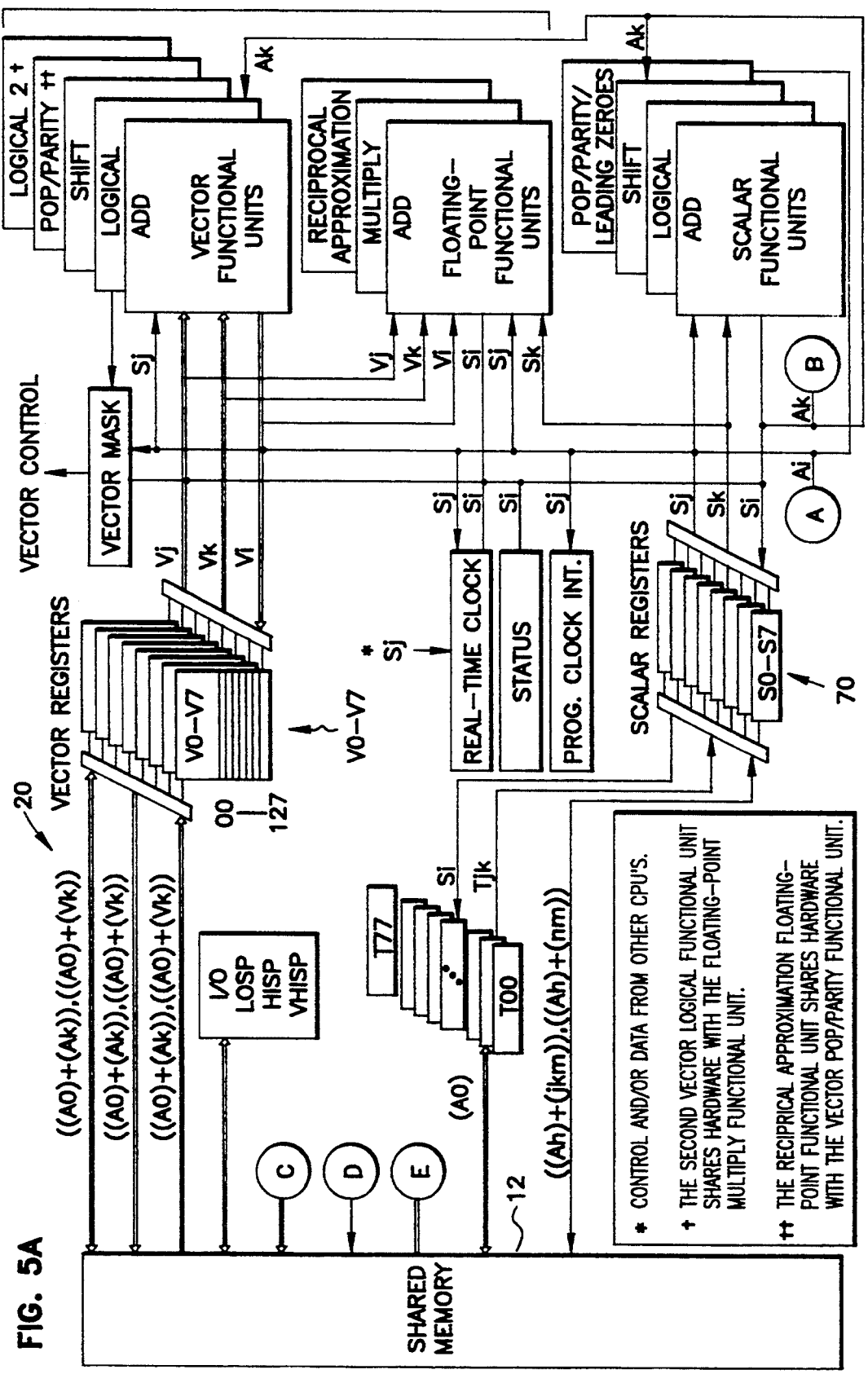
FIG. 5a,b show a more detailed block diagram of a vector processor of the type used in the present invention.
Figure 5B:
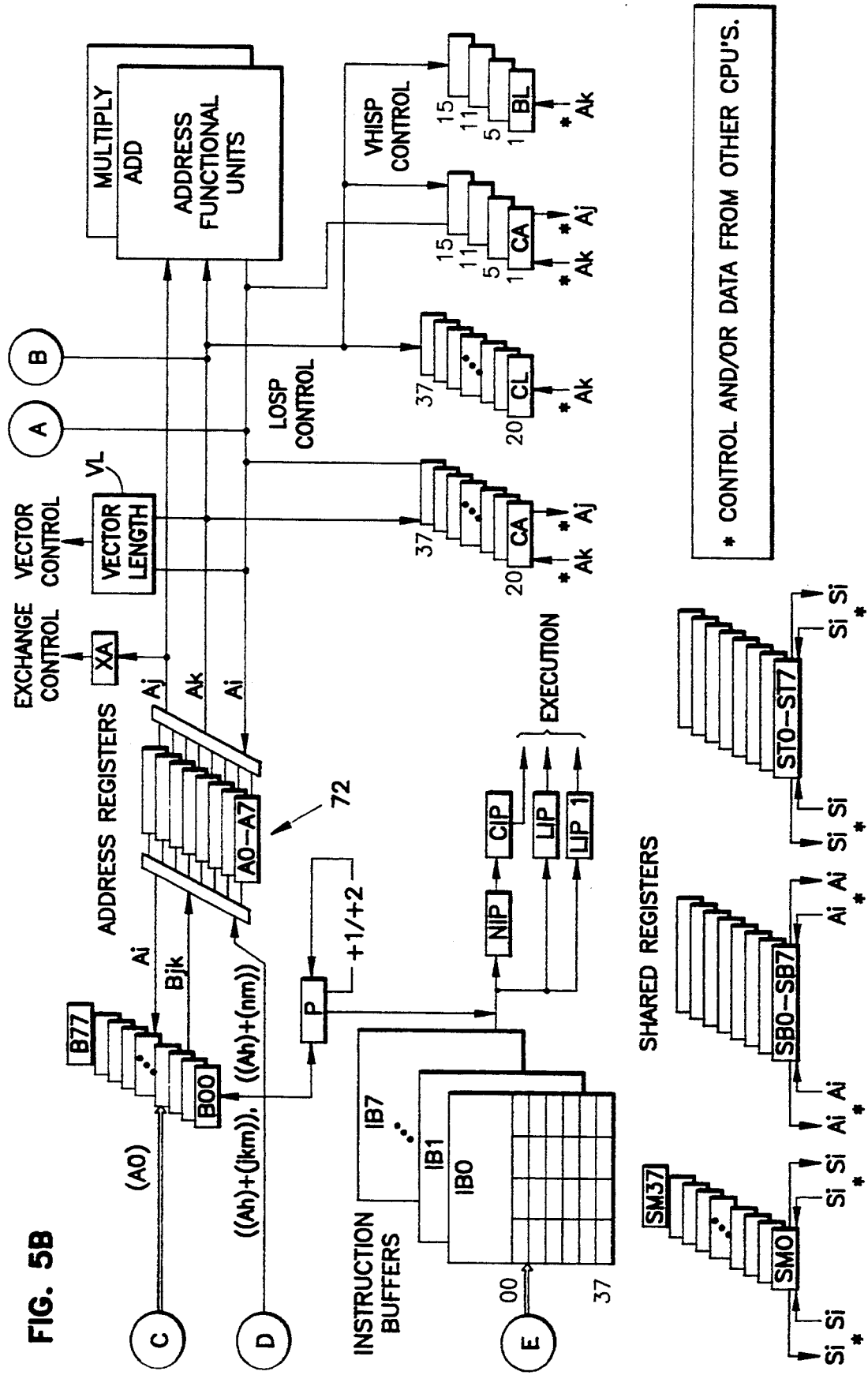

When exchange package 60 (as shown in FIG. 3) is transferred from shared memory 12 to a processor 20, exchange package 60 is broken up and the portions are saved in different storage areas of processor 20. Bits 32–63 of words 0–7 are stored in exchange parameter registers 74 (shown in FIG. 4B). Bits 0–31 of words 0–7, are stored in A registers 72 (as shown in FIG. 4A and 5B). Finally, the remaining words 10–17 are stored in S registers 70 (as shown in FIGS. 4A and 5A).

Although generally only system privileged users have access to monitor mode, in the preferred embodiment of the present invention the real-time processors are allowed access to monitor mode and to the corresponding instructions. As a result, the real-time processors have access to and can read or write data on low speed communication channels 42. The information on low speed communication channels 42 is generally system privileged and is used by the operating system to control system functions. For example, communication channels 42 contain base and limit address information, interrupt information, shared register contents, etc. As a result, the real-time processors have a direct connection to IOS 34 through which they can signal IOS 34 that output data is available. In essence, this allows real-time processors to avoid going through the operating system to signal IOS 34 that output data is available. As those skilled in the art are aware, typically a processor must go through the operating system to inform IOS 34 that output data is available. However, the time it takes to perform such an operation can be deadly to real-time performance. The direct connection provided through access to monitor mode and its corresponding privileged communication channels 42 provided by the present invention greatly increases the speed with which data can be output from the system during real-time operation.

A further advantage of giving real-time processors access to monitor mode is the ability to individually select whether a particular interrupt will remain on or turned off. In the preferred embodiment of the present invention, the monitor mode condition allows a processor to individually select which interrupts it will receive while in monitor mode. For example, a processor in monitor mode can select to receive an inter-processor related interrupt but not a floating point error interrupt. Because time is of the essence in real-time processing, bothering real-time processors with irrelevant or low priority interrupts can greatly inhibit real-time performance. Thus, each real-time processor can select with particularity which interrupts it wants to receive while executing a real-time job and turn off those which are irrelevant to the real-time job to be performed. Those skilled in the art will readily recognize that this ability to individually select interrupts greatly increases the ability of the system of the present invention to effectively execute in real-time.

Those skilled in the art will recognize that monitor mode can also be used by IOS 34 to notify a real-time processor across low speed communication channels 42 that input data is available. Again, this alternate embodiment has the advantage of avoiding the operating system, thus increasing the speed with which the real-time processors complete the real-time instructions.

Another method of the present invention uses the previously described mailbox scheme to notify IOS 34 that output data is available from a real-time processor. In this method, a real-time processor sends a one word transfer into multiprocessor system 10 to a specific predetermined memory location associated with IOS 34. This memory location is the dedicated "mailbox" for IOS 34. The transferred word contains information indicating that output data is available for the IOS to take away. For the IOS 34 to find out whether output data is available, IOS 34 simply polls the memory location once every predetermined time interval. When the mailbox contains the output ready information, IOS 34 then takes the data away from the real-time processor and sends it out to the relevant output devices (such as screen display, etc.). As those skilled in the art will readily recognize, this mailbox method of signaling IOS 34 that output data is available have the advantage of avoiding the operating system, thus increasing the speed with which the real-time processors complete their real-time instructions.

As described above, the present invention includes several alternative methods of informing IOS 34 that output data is available and also of informing a processor running a real-time job that input data is available. The real-time task involved and the overall system environment determine which method or combination thereof is to be used in a given situation.

Because the preferred embodiment of the present invention makes all of the alternatives available to the real-time processors, persons writing real-time code to run on the system of the present invention can take this into account when drafting their real-time code. In this way, they can elect to utilize the alternative which is most appropriate to the particular real-time job being addressed.

For example, if particular real-time code is memory intensive but rarely requires use of the shared I/O registers, that code could opt for sending signals/polling on the low speed communication channels 42 and/or using the real-time interrupts rather than polling on memory. The shared I/O registers are described in more detail in U.S. patent application Ser. No. 07/655,296 filed Feb. 14, 1991, pending, entitled "System for Distributed Multiprocessor Communication", which application is incorporated herein by reference. Thus, the memory polls by the real-time processor (to determine if input data is available) or by IOS 34 (to determine if output data is available) would not interfere with the time critical real-time job memory references.

Alternatively, if more than one processor is working on a particular real-time job, it would greatly reduce real-time performance to have the IOS/real-time processor using low speed communication channel 42. Instead, the real-time programmer could opt for polling a mailbox in memory and/or using the real-time interrupts to determine whether input or output data is available thereby not overburdening low speed communication channel 42 and reducing real-time performance.

Finally, if a processor is running more than one user job, the real-time interrupt would be a very effective way to notify a real-time processor that input data for the real-time job is available.

Thus, the present invention has been described which provides a flexible real-time operating scheme for a multiprocessor computing system. Because the present invention provides several alternative means for most efficiently performing real-time tasks, the present invention is easily adaptable for use with many different real-time applications.

Although a specific embodiment has been illustrated and described herein, it will be appreciated by those of ordinary skill in the art that any arrangement which is calculated to achieve the same purpose may be substituted for the specific embodiment shown. For example, different real-time priority schemes, different logic designs, and different multiprocessing systems could be used without departing from the scope of the present invention. This application is intended to cover any adaptations or variations of the present invention. Therefore, it is manifestly intended that this invention be limited only by the claims and the equivalents thereof.

We claim:

1. A method of real-time I/O processing in a multiprocessor vector computing system comprising a plurality of vector processing means sharing a common memory means, and an operating system, comprising the steps of:
   (a) designating a subset of the processing means to execute real-time instructions;
   (b) setting a shared memory reference priority controller such that the designated processing means has the highest priority for references to said shared common memory means;
   (c) sending a real-time signal to each of the designated processing means, for signaling the designated processing means to begin executing the appropriate real-time instructions;
   (d) bringing each of the designated processing means, in response to the real-time signal, into a state wherein the designated processing means is allowed access to a privileged operational mode, and therefore access to instructions corresponding to the privileged operational mode and to a system privileged communication channel connecting the processing means to the I/O control means;
   (e) executing the real-time instructions in the designated processing means;
   (f) signaling an I/O control means from the designated processing means when output data is available using an output signaling means; and
   (g) signaling the designated processing means from the I/O control means that input data is available using an input signaling means, whereby said steps (e)–(g) are executed in said privileged operational mode.

2. The method according to claim 1 wherein step (f) further includes the step of;
   (f1) sending a data word from the designated processing means to the I/O control means along the system privileged communication channels; and
   (f2) polling the system privileged communication channels with the I/O control means until the data word indicates that output data is available, such that the operating system is bypassed.

3. The method according to claim 1 wherein step (f) further includes the steps of:
   (f1) sending a data word from the designated processing means to a predetermined memory location; and
   (f2) polling the predetermined memory location with the I/O control means until the data word indicates that output data is available, such that the operating system is bypassed.

4. The method according to claim 1 wherein step (g) further includes the steps of:
   (g1) sending a data word from the I/O control means to the designated processing means along the system privileged communication channels; and
   (g2) polling the system privileged communication channels with the designated processing means until the data word indicates that input data is available, such that the operating system is bypassed.

5. The method according to claim 1 wherein step (g) further includes the steps of:
   (g1) sending a data word from the I/0 control means to a predetermined memory location; and
   (g2) polling the predetermined memory location with the designated processing means until the data word indicates that input data is available, such that the operating system is bypassed.

6. The method according to claim 1 wherein step (g) further includes the step of sending an interrupt to the operating system to inform the designated processing means that input data is available.

7. The method according to claim 6 further including the step of sending an interrupt along a dedicated hardware connection from the I/O control means to the designated processing means to inform the designated processing means that input data is available.

8. A method of performing real-time I/O processing operations in a multiprocessor vector computing system which comprises a plurality of processors sharing a common memory, and a memory reference controller for controlling memory references between the processors and the shared memory according to a predetermined priority scheme, each processor being coupled via a privileged communication channel and via a dedicated real-time interrupt line to an I/O processor, the computing system being connected via said I/O processor to a operator work station, and via a maintenance channel to a maintenance work station; said method comprising the steps of:

(a) decoding a real-time command in the operator work station;

(b) designating a subset of the processors to execute the real-time command by sending a real-time interrupt signal from the I/O processor along the real-time interrupt lines to each designated processor so as to stop and save a task which said designated processor is currently executing and to start execution of an appropriate real-time task;

informing, in response to the real-time command, the maintenance work station by the operator work station to alter the priority scheme controlled by the memory reference controller, so that all designated processors have a memory reference priority which is higher than a memory reference priority of any processor which is not designated;

(d) bringing each designated processor, in response to the real-time command, into a state wherein it is allowed to have access to a privileged operational mode under control of a predetermined block of data being transferred from the shared memory, in order to have access to instructions corresponding to the privileged operational mode and to the privileged communication channel; and (e) bypassing the operating system in that each designated processor has access to the privileged communication channels to read and write data thereon and to signal the I/O processor when output data from the processor is available and to signal the processor when input data from the I/O processor is available.

9. The method according to claim 8 wherein step (e) further includes the steps of:

(e1) sending a data word from the designated processor to a predetermined memory location; and (e2) polling the predetermined memory location with the I/O processor until the data word indicates that output data is available, such that the operating system is bypassed.

10. The method according to claim 8 wherein step (e) further includes the steps of:

(e1) sending a data word from the I/O processor to a predetermined memory location; and (e2) polling the predetermined memory location with the designated processing means until the data word indicates that input data is available, such that the operating system is bypassed.

11. The method according to claim 8 wherein step (e) further includes the step of sending an interrupt to the operating system to inform the designated processor that input data is available.

12. The method according to claim 11 further including the step of sending an interrupt along the real-time interrupt line from the I/O processor to the designated processor to inform the designated processor that input data is available.

* * * * *